United States Patent [19]

Johnson et al.

[11] Patent Number: 4,690,972
[45] Date of Patent: Sep. 1, 1987

[54] METHOD OF PRODUCING POLY(ARYLENE SULFIDE) COMPOSITIONS AND ARTICLES MADE THEREFROM

[75] Inventors: Timothy W. Johnson; William H. Beever; James E. O'Connor; Jennings P. Blackwell, all of Bartlesville, Okla.

[73] Assignee: Phillips Petroleum Company, Bartlesville, Okla.

[21] Appl. No.: 848,436

[22] Filed: Apr. 4, 1986

[51] Int. Cl.$^4$ .............................................. C08K 3/20
[52] U.S. Cl. ................................... 524/609; 525/471; 528/388; 524/495; 524/496
[58] Field of Search ................... 525/471; 528/388; 524/496, 495, 609

[56] References Cited

U.S. PATENT DOCUMENTS

| | | | |
|---|---|---|---|
| 4,292,105 | 9/1981 | Taylor | 156/242 |
| 4,421,588 | 12/1983 | Davies | 156/308.2 |
| 4,440,890 | 4/1984 | Robeson | 524/159 |
| 4,447,581 | 5/1984 | Quella et al. | 525/189 |
| 4,482,683 | 11/1984 | Quella et al. | 525/537 |
| 4,528,346 | 7/1985 | Sugie et al. | 525/523 |

FOREIGN PATENT DOCUMENTS

| | | |
|---|---|---|
| 62830 | 10/1982 | European Pat. Off. . |
| 2108983 | 5/1983 | United Kingdom ................ 525/471 |

OTHER PUBLICATIONS

Zeng et al., Scientia Sinica, vol. XXVII, No. 4, pp. 333–340, Apr. 1984.
Zeng et al., Die Angewandte Makromolekulare Chemie, vol. 127, (1984), pp. 103–114.
Blundell et al., SAMPE Quarterly, vol. 17, No. 1, Oct. 1985, pp. 1 to 6.
O'Connor et al., Conference Proceedings, pp. 963–970, Fifth International Conference on Composite Materials, Jul.–Aug. 1985.
D. G. Brady, "The Crystallinity of Poly(phenylene sulfide) and its Effect on Polymer Properties", Journal of Applied Polymer Sceince, vol. 20, pp. 2541–2551, (1976).

Primary Examiner—Melvyn I. Marquis
Attorney, Agent, or Firm—J. D. Brown

[57] ABSTRACT

Compositions comprising a poly(arylene sulfide) which crystallizes to a fine-grained crystalline morphology are provided. A method is also provided for treating compositions comprising a poly(arylene sulfide) by incorporation of a crystalline morphology altering additive, heating the resulting mixture above the melting point of the poly(arylene sulfide) and cooling the mixture at a rate of less than 50° C. per minute. Exemplary additives include a poly(arylene sulfide-ketone) and a polyaryl ketone.

43 Claims, 2 Drawing Figures

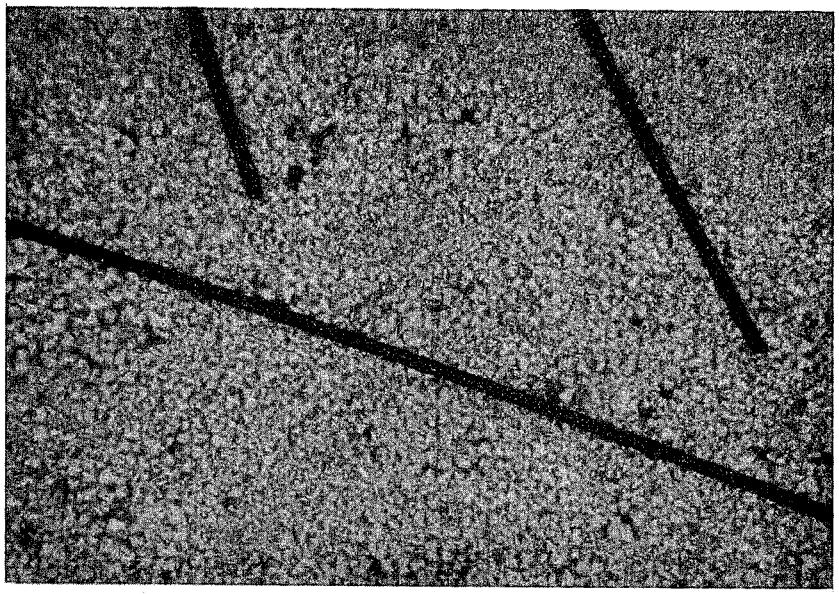
FIG. 2 INVENTION RUN
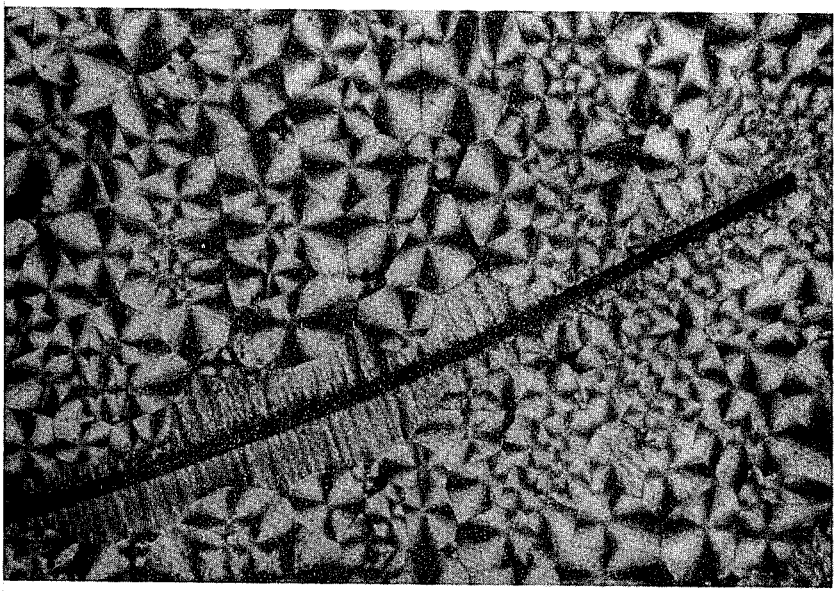
FIG. 1 COMPARATIVE RUN

METHOD OF PRODUCING POLY(ARYLENE SULFIDE) COMPOSITIONS AND ARTICLES MADE THEREFROM

FIELD OF THE INVENTION

This invention relates to methods of preparing poly(arylene sulfide) compositions by incorporation of additives which affect the crystalline morphology of the poly(arylene sulfide) and subsequent heating and cooling steps. In another aspect, this invention also relates to poly(arylene sulfide) compositions.

BACKGROUND OF THE INVENTION

Poly(arylene sulfide) resins, e.g., poly(phenylene sulfide) (PPS), have become well known in the art for their thermal resistance, chemical resistance and an excellent balance of physical properties for use in preparing a variety of compositions useful in preparing articles by injection molding or compression molding techniques. These resins are also useful in forming coating compositions which are applied to a variety of substrates. These coatings also have the desired qualities of thermal resistance and chemical resistance. It was further found that the crystallization behavior of the poly(arylene sulfide) was important in obtaining good properties from compositions comprising such poly(arylene sulfide) polymers. For example, in the injection molding of compositions comprising poly(phenylene sulfide) the desired good properties could be obtained by utilizing a high mold temperature such as from about 120° to 204° C., or by utilizing a cold mold (quenching) followed by an annealing step such as at about 205° C. These techniques appeared to produce articles with the highest level of crystallinity in the poly(phenylene sulfide) resin in the composition.

More recently, thermoplastic composites employing poly(arylene sulfide) resins in the matrix have become increasingly important. The desirable properties of temperature resistance and solvent resistance are also evident in such composites and these properties as well as outstanding strength are also affected by the matrix crystallinity behavior.

For many manufacturers the hot mold procedure represents an added expense in the equipment and energy required to carry out such a procedure. Furthermore, the quench-annealing process may also require added special equipment and reduces the freedom of choice in the operating procedure.

It is an object of this invention to provide a method for treating a poly(arylene sulfide) to increase the melt crystallization temperature ($T_{mc}$) of the poly(arylene sulfide).

It is a further object of this invention to provide a method for increasing the rate of crystallization of a crystallizable poly(arylene sulfide) composition at a given temperature.

It is a further object of this invention to provide a method for altering the crystalline morphology of poly(arylene sulfide) compositions.

It is a still further object of this invention to provide additives which, when admixed with compositions comprising a poly(arylene sulfide) and subsequently subjected to heating and cooling steps, promote the formation of a fine-grained crystalline morphology in the poly(arylene sulfide).

Another object of the invention is to provide a method for preparing a fiber reinforced thermoplastic resin matrix comprising a poly(arylene sulfide) and an additive which promotes the formation of a fine-grained cyrstalline morphology without the necessity of quench-annealing the resultant composite to obtain optimal properties. Another object is to provide poly(arylene sulfide) compositions.

SUMMARY OF THE INVENTION

In one embodiment the invention provides a method of preparing poly(arylene sulfide) compositions wherein a crystalline morphology-modifying additive is incorporated into the poly(arylene sulfide) composition to form a mixture comprising the additive. The mixture is then heated to a temperature above the melting point of the poly(arylene sulfide) component in the mixture and the mixture then cooled at a rate sufficient to permit the formation of the modified crystalline morphology. The thus modified polymer represents another embodiment of the invention and is characterized by the desired properties of high temperature resistance, solvent resistance and good physical properties. Optical microscopic examination for crystallinity of thin specimens of modified poly(arylene sulfide) compositions made according to the invention revealed a fine-grained morphology of small spherulites of the poly(arylene sulfide) that were somewhat ill defined and on the other of about 5 to about 15 $\mu$m in diameter. In contrast, specimens made without the additive and without the quench-annealing treatment showed large well defined spherulites of about 30 to over 100 $\mu$m and even larger diameter.

It was further observed that the incorporation of the additives of this invention into the poly(arylene sulfide) resulted in an increase of the melt crystallization temperature ($T_{mc}$) as determined by a differential scanning calorimeter. This increase in $T_{mc}$ was on the order of about 15° C. This large increase in $T_{mc}$ is believed to be due to a nucleation effect wherein the additive provides many sites for initiation of crystallization and thereby promotes a rapid and extensive crystallization of the poly(arylene sulfide) resin to the fine-grained morphology described above. To the best of our knowledge, nucleation of poly(arylene sulfide) compositions by the incorporation of additives has not been previously described.

BRIEF DESCRIPTION OF THE DRAWINGS

FIG. 1 is a photomicrograph of a thin section of a composite material made as a comparative run.

FIG. 2 is a photomicrograph of a thin section of a composite material made as an invention run to illustrate certain features of the invention.

DETAILED DESCRIPTION OF THE INVENTION

Any crystallizable poly(arylene sulfide) (PAS) can be employed in this invention, including copolymers, mixtures and blends. Usually, the PAS will contain repeat units of the formula [Ar-S] wherein Ar is a divalent aromatic radical. Preferred divalent aromatic radicals can be independently selected from the group consisting of phenylene, biphenylene or naphthylene.

Suitable polymers will be meltable without substantial decomposition and generally have a flow rate of from 0 to about 500 g/10 minutes as determined by ASTM method D1238-79, procedure B, modified to use a 5 kg weight, 316° C. temperature, and 0.17 mm orifice.

Usually the poly(arylene sulfide) will comprise a poly(phenylene sulfide) which has at least about 90 percent by weight of the repeat units with the formula

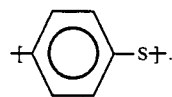

Preferably the poly(arylene sulfide) will be poly(p-phenylene sulfide) which has a flow rate of from about 20 to about 100 g/10 minutes as determined by the method noted above. The melting temperature of the poly(arylene sulfide) employed in this invention will generally range from about 275° to about 290° C. and preferably from 280° to 290° C., and a $T_{mc}$ usually in the range of 170° C. to 205° C., preferably from 180° C. to 200° C. The poly(arylene sulfide) can be branched or linear and can be partially crosslinked or substantially free of crosslinks. It is presently preferred that the poly(arylene sulfide) be linear and substantially free of crosslinks since it is believed that the desirable results achieved by the invention will be most significant for such resins.

Any additive can be employed in this invention which is effective to achieve the crystalline morphology modification of the poly(arylene sulfide). Usually, the additive will comprise a polymer containing additive since polymers are expected to be readily compatible. Usually, it will also be crystallizable and have a high crystalline melting point, since crystallization of the additive is though to be important for the action of the nucleating agent. Polymers selected from the group consisting of poly(arylene sulfide-ketone) (PASK) and a polyaryl ketone (PAK) are most preferred. It is also preferred that the PASK or PAK have a melting point of at least about 20° C. above the melting point of the PAS and more preferably at least about 40° to about 100° C. above the PAS melting point.

The poly(arylene sulfide-ketone) can be prepared by the reaction of an aromatic dihalo compound in which each halogen atom is activated by a keto group present in the para position, with an essentially equivalent amount of an alkali metal sulfide in a polar solvent. The preferred PASK will be insoluble in 1-chloronaphthalene at 230° C. Usually, a poly(phenylene sulfide-ketone) having repeat units of the type

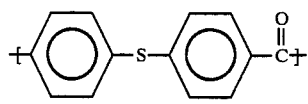

is employed. A preferred poly(phenylene sulfide-ketone) will have a reduced viscosity of from about 0.3 to 3 as determined by viscosity measurements at 25° C. in 98 percent by weight sulfuric acid for a polymer concentration of about 0.5 g per 100 mL of solution. The PPSK will turn red when exposed to the concentrated $H_2SO_4$.

At present, it is preferred to employ a polyaryl ketone as the additive according to this invention. The preferred polyaryl ketone can be characterized as a polymer having repeat units of the formula

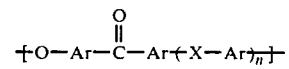

wherein Ar is a divalent aromatic radical independently selected from the group consisting of phenylene, biphenylene or naphthylene, X is independently selected from the group consisting of O,

or a direct bond and n is an integer of from 0 to 3. The polyaryl ketone employed is usually a polyether ether ketone and a preferred polyether ether ketone is poly-1,4-oxyphenyloxy-p,p'-benzophenone. Such a polymer is commercially available from ICI. The polyether ether ketone will generally have a reduced viscosity of from about 0.6 to about 3 as measured in concentrated sulfuric acid at 25° C.

Any amount of additive can be employed according to this invention which provides a changed crystalline morphology. Generally from 0.01 to about 30 percent by weight, usually 0.01 to 10 percent by weight, based on the combined weights of the additive and the poly(arylene sulfide) will be employed because such amounts of additive would be expected to provide changed crystalline morphology when coupled with proper heating and cooling steps. For PASK or PAK, amounts in the range of 0.01 to 5 percent by weight of the additive (PAS wt/additive wt. between 10,000:1 and 20:1) have provided good results and economy. For economy and good retention of PAS properties, about 0.25 to about 2.5 percent by weight of PASK or PAK (PAS wt/additive wt. between 400:1 and 40:1) is expected to be very beneficial.

The poly(arylene sulfide) compositions which contain the additives of this invention as described above can also contain fillers, processing aids, pigments, stabilizers and the like which are usually employed in poly(arylene sulfide) compositions. For example, fillers such as clay, talc, silica, alumina, titanium dioxide, chopped glass fibers and the like can be employed. Other materials useful in the PAS compositions as processing aids or corrosion inhibitors include lithium carbonate, sodium carbonate, calcium carbonate, zinc stearate and polyethylenes. Ferric oxide and carbon black are examples of pigments that can be employed in the PAS compositions.

The poly(arylene sulfide) and the additive employed in this invention plus any fillers, processing aids, pigments and the like can be blended together by conventional means. For example, particles or pellets of the poly(arylene sulfide) and the additive also in a finely divided particle or pellet form can be tumbled together with any fillers or other compound ingredients in a rotating drum mixing device to form a substantially homogeneous mixture of the solids materials employed in the total mixture. The mixture of solids can then optionally be further processed under fluxing conditions in a mixing extruder for thermoplastic resins to provide pellets of the mixture for further use. It is also possible to preblend any of the several components prior to admixing with the additional components in a drum tumbler mixer. For example, a master batch of the poly(arylene sulfide) polymer with pigment, stabilizer, and processing aid may be premixed under fluxing conditions and pellets of this material utilized to blend with further solid particulate components of the final mixture. In any event, it is preferred that a substantially homogeneous mixture of all the components be employed for the subsequent heating and cooling steps.

In another embodiment, the poly(arylene sulfide) compositions which contain the additives of this invention and optionally, fibers, fillers, processing aids, pigments and the like can be heated in conventionally employed resin processing equipment such as electrically heated presses or molds. The heating step is carried out to melt the poly(arylene sulfide) and at least 15° C. further, preferably to a temperature of at least about 25° C. to about 75° C. above the melting point of the poly(arylene sulfide) and in one embodiment to a temperature which at least partially melts said additive. The heated mixture of the poly(arylene sulfide) and the additive which may or may not be also in a molten condition, depending upon its melting point, can then be subjected to the cooling step wherein the cooling is less than about 50° C. per minute, broadly between about 0.1° to about 50° C. per minute and preferably, about 1° to about 10° C. per minute. This rate of cooling can be achieved by the use of insulated molds or presses. These molds or presses can also be equipped with means for circulating cooling fluid therethrough such that the heat loss by means of the cooling fluid can be controlled to maintain the desired rate of cooling of the composition. Molds with a large mass of metal also cool slowly.

By heating the poly(arylene sulfide) composition which contains the additive of this invention to a temperature which melts the poly(arylene sulfide) and to at least about 25° C. beyond this temperature and then cooling the composition at the rate described above, there is obtained a rapid and fine-grained crystallization of the poly(arylene sulfide). These fine-grained spherulites of the crystallized poly(arylene sulfide) are characteristic of the morphology obtained in poly(arylene sulfide) polymers by the previously described quen-channealed process. The composition of the invention will generally have a $T_{mc}$ of at least 210° C., usually in the range of 210° C. to 250° C., preferably 215° C. to 235° C.

A particularly important aspect of this invention concerns its application to poly(arylene sulfide) compositions which also contain fiber reinforcing agents. For example, fiber reinforcing agents containing fibers such as carbon, glass, aramid, boron, poly(benzoxazole), poly(benzimidazole), poly(benzothiazole) and other high-temperature stable fibers are employed as fiber reinforcing agents. Although chopped, short glass fibers can be employed, these compositions preferably contain relatively long fibers which can be randomly oriented or preferably oriented in a continuous (non-random) manner in the poly(arylene sulfide) composition. Carbon fiber is preferably employed in preparing these compositions and it is also preferred that a continuous carbon fiber be employed. For example, the carbon fiber can be used as a woven mat or as oriented bundles of fiber within the poly(arylene sulfide) matrix. The carbon fiber can be employed having a sizing composition on the surface thereof. The amount of fiber employed in this aspect of the invention can broadly be from about 30 to about 80 percent by weight and preferably from about 40 to about 75 weight percent based on the combined weights of the carbon fiber, poly(arylene sulfide) and polymer additives.

In this aspect of the invention the carbon fiber reinforcing agent can be coated with the polymer additive component of the invention i.e., the poly(arylene sulfide-ketone) or the polyaryl ketone or a mixture thereof. In this manner the polymer additive which is coated on the fiber surface is incorporated into the final mixture with the poly(arylene sulfide), and is present to exert its crystalline morphology altering effect. As a further elaboration on this aspect, the carbon fiber strands can be passed through a dispersion, for example, an aqueous dispersion, of a polyaryl ketone whereby the fiber picks up a particulate coating of the polyaryl ketone and said polymer coated fiber is then pressed into a softened matrix of the poly(arylene sulfide) to embed the polymer coated fiber therein. The resulting poly(arylene sulfide) composition which now contains the polymer coated fiber is subjected to heating above the melting point of the poly(arylene sulfide) as described before and further cooled at a rate sufficient to permit the formation of the fine-grained crystalline morphology of the poly(arylene sulfide) also as described before. In another embodiment the carbon fiber strands can be passed through a dispersion of a mixture of poly(arylene sulfide) and polyaryl ketone particles such that the fiber is coated with the mixture of polymers. The fibers can be pulled through a heated die slot to soften or melt the polymer matrix and thoroughly impregnate the fibers with the polymer mixture. The material leaving the die can be in the form of a thin tape which can be rolled up and stored for further use in preparing composites.

As indicated above, the fiber-reinforced poly(arylene sulfide) compositions are highly useful in forming thermoplastic composites. For example, flat, semi-processed products can be made from poly(arylene sulfide) compositions of this invention which are impregnated on carbon fiber roving strips, preferably 2 to 150 cm wide, which after cooling, are cut into plate-like pieces or wound continuously onto reels. These unidirectionally fiber-reinforced "prepregs" which are about 0.1 to about 0.5 mm thick, can be stacked in layers. Moreover, the individual prepreg tapes can be arranged at any desired angle to each other. These stacks can then be shaped into finished articles by press-molding at temperatures above the melting point of the poly(arylene sulfide) as described above and then cooled at a rate sufficient to permit the formation of the fine-grained crystalline morphology in the poly(arylene sulfide) composition. The quench-annealing process described above for treating molded articles of poly(arylene sulfide) compositions, has also been applied to the fiber-reinforced poly(arylene sulfide) matrices in order to obtain the fine-grained crystalline morphology of the polymer. It was observed that this quench-annealing process also provided for improved physical properties of the fiber-reinforced composite, especially those properties measured in the transverse direction to the fiber orientation. Thus this invention provides a convenient and simplified method to obtain improved properties in the fiber-reinforced poly(arylene sulfide) composites which are associated with the fine-grained crystalline morphology of the poly(arylene sulfide).

EXAMPLE I

The effect of various additives on the melt crystallization temperature ($T_{mc}$) of a poly(phenylene sulfide) was examined by a thermal analysis technique wherein samples of the poly(phenylene sulfide) containing an additive were heated to about 320° C. then cooled to about 40° C. at a rate of 20° C. per minute in a Differential Scanning Calorimeter (Perkin-Elmer 7 Series Thermal Analysis System). $T_{mc}$ values were readily determined from the exotherms which appeared on the cooling curves.

The poly(phenylene sulfide) was obtained from Phillips Chemical Co. as Ryton® MR03 and had a flow rate of 30 g/10 min as determined by ASTM method D 1238-79, procedure B, modified to use a 5 kg weight, 316° C. temperature, and 0.17 mm orifice.

Each additive (0.5 g) at 1 percent by weight, based on the sum of PPS plus additive, was dry blended with the PPS particles (49.5 g) then mixed in a Brabender internal mixer at 75 rpm and at 315° C. Samples (about 10 mg) then were examined as described above in the thermal analysis instrument.

The results of these tests are shown in Table I.

TABLE I

Effect of Additives on $T_{mc}$ of PPS

| Run No. | Additive | $T_{mc}$, °C. |
|---|---|---|
| 1 | None | 198 |
| 2 | Sodium benzoate | 204 |
| 3 | 1,5-Naphthalene disulfonic acid, disodium salt | 195 |
| 4 | Phthalocyanine | 194 |
| 5 | Phthalocyanine pigment, Monastral blue | 201 |
| 6 | Aluminum oxide, anhydrous | 201 |
| 7 | Silicon oxide, cobwebs | 199 |
| 8 | Silicon carbide, whiskers | 202 |
| 9 | Calcium sulfate, powder | 197 |
| 10 | Calcium sulfate, fibers | 196 |
| 11 | Mica, Micromesh 3 | 194 |
| 12 | Polyethylene, high density[a] | 196 |
| 13 | Poly(phenylene sulfide-ketone)[b] | 218 |
| 14 | Polyether ether ketone[c] | 215 |

[a] Density = 0.967 g/cms$^3$, melt index of 30 by ASTM D1238.
[b] Prepared from reaction of 4,4'-dichlorobenzophenone (2 mole), NaSH (2.08 mole) and NaOH (2 mole) in 2,400 mL N—methyl-2-pyrrolidinone at 250–270° C. for 3.5 hours. Polymer I.V. 0.81.
[c] PEEK, medium viscosity grade, 380P Lot PB/64 obtained from ICI Americas, Inc., Wilmington, Delaware USA.

The results in Table I show that of a wide variety of materials tested, the poly(phenylene sulfide-ketone) (PPSK) and polyether ether ketone (PEEK) additives of this invention provided a large (>15° C.) increase in the $T_{mc}$ of the poly(phenylene sulfide). This result indicates that the invention additives provided a nucleation effect in the crystallization of PPS from the melt. It is noteworthy that sodium benzoate which is known as a nucleating agent for several polymers, including polypropylene and polyethylene terephthalate, is much less effective than the additives of this invention.

EXAMPLE II

The invention additives employed in Example I were further examined for their effect on the $T_{mc}$ of the PPS used in Example I by additional tests. Some of these tests utilized various levels of the PPSK additive and other tests used a higher mixing temperature (330° C.) than used in Example I. In addition, a nitrogen purge of the Brabender mixer was employed during the mixing of each sample. The results of these tests are shown in Table II.

TABLE II $T_{mc}$ of PPS Mixtures with a PPS or PEEK

| Run No. | Additive, wt % | Mixing Temp., °C. | $T_{mc}$, °C. |
|---|---|---|---|
| 1 | None | 315 | 191 |
| 2 | PPSK, 0.4 | 315 | 215 |
| 3 | PPSK, 1.0 | 315 | 217 |
| 4 | PPSK, 2.5 | 315 | 220 |
| 5 | PEEK, 1.0 | 315 | 219 |
| 6 | PPSK, 1.0 | 330 | 216 |
| 7 | PEEK, 1.0 | 330 | 221 |
| 8 | Na benzoate, 1.0 | 330 | 203 |

The results (Runs 1–5) in Table II show that the $T_{mc}$ increase for PPS by use of the PPSK additive was not significantly concentration dependent in the range of 0.4–2.5 wt percent of the additive. The results in Runs 3,5,6 and 7 also show that increasing the mixing temperature from 315° C. to 330° C. had little effect on the $T_{mc}$ increase achieved by the additives of the invention. Run 8 shows that increasing the mixing temperature from 315° C. to 330° C. did not significantly change the effectiveness of sodium benzoate as a nucleation agent for PPS. See Run 2, Table I.

EXAMPLE III

Further tests were conducted to examine the effect on PSS $T_{mc}$ of adding carbon fibers to the PPS compositions with and without the additives of this invention. These tests were made by pressing films at 315° C. of the compositions of Runs 1, 3 and 5 of Example II. Carbon fibers (Hercules AS-4, 12K unsized) were then hot pressed at 315° C. between layers of the films thereby embedding the fibers in the film to provide compositions having about 50% by weight of carbon fiber based on the total composition. Samples then were analyzed by the thermal analysis procedure described in Example I. The results of these tests are shown in Table III.

TABLE III $T_{mc}$ of PPS Mixtures with PPSK or PEEK also Containing Carbon Fibers

| Run No. | Additive | PPS $T_{mc}$, °C. With Fiber | No Fiber |
|---|---|---|---|
| 1 | None | 201 | 191 |
| 2 | PPSK | 221 | 217 |
| 3 | PEEK | 223 | 219 |

The results in Table III show that carbon fiber alone raises the $T_{mc}$ of PPS to a small to moderate extent (~10° C.). It is also seen that the carbon fiber effect does not interfere with or obscure the large effect on PPS $T_{mc}$ achieved by the invention additives and may be at least partially additive to the effect produced by the invention additives.

EXAMPLE IV

Further tests of the effect of PEEK on the $T_{mc}$ of PPS were conducted. The polymers used were the same as those employed in Example I.

Several mixtures of PEEK and PPS were prepared in the form of aqueous slurries in the following manner. The PEEK and PPS resins were individually air milled then mixed together in dry form in the relative amounts shown below in Table IV. Each 10 g mixture or comparative sample (PPS alone) was then slurried in 100 mL $H_2O$ containing 1 mL of surfactant (ethoxylated octyl phenols (Fisher)). Preliminary examination of molded (315° C.) and quenched samples of polymer recovered by drying about 4 mL portions of the slurries at 135° C. indicated that the surfactant level was too high and that a higher molding temperature was needed. Thus, each of the previously prepared slurries was diluted to 300 mL total volume with water, mixed and allowed to stand overnight. The supernatant liquid was decanted from each slurry to leave about 50 mL total volume. Each slurry was then stirred and 3 mL portions were dried for 3 hours at 140° C. Each dried polymer sample was then molded at 365° C. with a 2 minute heat and 2 minute hold, then quenched in ice water. These products were then analyzed by the thermal analysis procedure described in Example I. The results obtained in these tests are presented in Table IV below.

TABLE IV $T_{mc}$ of PPS Mixtures with PEEK Recovered from Aqueous Slurries

| Run No. | PPS/PEEK g/g | PEEK wt % | PPS $T_{mc}$ °C. | ΔT, Width @ Half Peak Height |
|---|---|---|---|---|
| 1 | 10/0 | 0 | 214 | 13.6 |
| 2 | 9.9/0.1 | 1 | 229 | 12.7 |
| 3 | 9.75/0.25 | 2.5 | 234 | 7.1 |
| 4 | 9.5/0.5 | 5 | 235 | 6.9 |

Although the $T_{mc}$ of the control run (Run 1) was higher than previously reported in Examples I-III, the $T_{mc}$ values for Runs 2-4 were still 15°-20° C. higher than the value found for Run 1.

It was also observed that the $T_{mc}$ exotherm peak width at half peak height (ΔT) decreased significantly as the 20° C./minute cooling rate as the amount of PEEK in the polymer mixture increased. This result is indicative of an increase in crystalline nucleation site density with a decrease in ΔT and thus also indicates an increase in crystalline nucleation site density with an increase in the amount of PEEK present.

EXAMPLE V

Tests were made using an invention additive (PEEK, same as employed in Examples above) in the same type of PPS as used in Examples above (Ryton ® MR03) for the production of a continuous carbon fiber reinforced prepreg tape prepared by a pultrusion process. The prepreg tape was employed to make samples of multilayer composites which were subjected to different heating/cooling procedures. Next, properties of the composite samples were measured both in the direction of fiber orientation and transverse to the fiber orientation.

The pultrusion process was conducted by pulling strands (13) of carbon fiber (Hercules AS-4) through an aqueous slurry of a mixture of PPS and PEEK. The recipe for the aqueous slurry was 16,000 mL H$_2$O; 1,104 g PPS: 27.6 g PEEK and 11.3 g of a surfactant (ethyloxylated octyl phenols). The fibers, coated with the PPS/PEEK mixture from the aqueous slurry, then were pulled through a die heated to 370° C. to melt or soften the PPS/PEEK mixture and thoroughly impregnate the fiber strands with the resin mixture. The material exiting the die in the form of a unidirectional carbon fiber-containing prepreg tape had a carbon fiber content of about 60% by weight, based on the sum of the weights of carbon fiber, PPS and PEEK. The amount of PEEK present was about 2.4% by weight, based on the sum of the weights of PEEK and PPS.

A similar prepreg tape was prepared in the manner described about but which employed PPS alone in the aqueous slurry bath.

Composite laminates of the prepreg tapes were prepared by placing 19 plies of the tape cut to fit three 3×7 (w×1) inch slots and one 6×4 (w×1) inch slot in a 0.120 inch thick aluminum picture frame mold. The 6×4 (w×1) inch slot employed two stacks of the 19 ply tape placed side-by-side and then fused at the side-by-side junction of each ply. This composite sample was employed to measure properties in the direction transverse to the fiber orientation. The filled mold was heated at 371° C. (700° F.) in a Pasadena 50 ton laboratory press for 4 minutes but with no applied pressure, then for 4 minutes at 150 psig. The press was then shut off and the mold allowed to cool in the press (usually overnight) at a rate of about 1° C. per minute.

Two sets of samples (Runs 1 and 2) were prepared as described above to form prepreg tapes using the PPS/PEEK mixture of the invention. One set (Run 2) was subjected to annealing at 204° C. (40020 F.) for two hours after the slow cooling to ambient temperature. The samples prepared from the prepreg tape made using PPS alone (Run 3) were not subjected to a further annealing step.

Physical properties on the above samples were determined using an Instron Tensile Tester, Model 1125, according to the appropriate ASTM procedures. The results obtained in these tests are shown below in Table V.

TABLE V

| | Run No. | | |
|---|---|---|---|
| | 1 | 2 | 3 (Control) |
| Tensile modulus, MSI[a] | 16.53 | 16.39 | 15.44 |
| Tensile strength, KSI[b] | 205.63 | 215.70 | 183.77 |
| Elongation, % | 1.13 | 1.2 | 1.1 |
| Flexural modulus, MSI | 14.76 | 15.70 | 14.93 |
| Flexural strength, KSI | 158.33 | 161.14 | 137.24 |
| Maximum deflection, inches | 0.243 | 0.234 | 0.206 |
| Fiber strain, % | 0.011 | 0.010 | 0.009 |
| Compression modulus, MSI | 19.55 | 19.08 | 18.5 |
| Compression strength, KSI | 73.06 | 76.07 | 68.03 |
| Transverse | | | |
| Tensile modulus, MSI | 1.23 | 1.19 | 0.15 |
| Tensile strength, KSI | 2.65 | 2.20 | 0.5 |
| Elongation, % | 0.20 | 0.17 | 0.28 |

[a]MSI is million psi.
[b]KSI is thousand psi.

Two significant conclusions were deduced from the above results. First, the PEEK additive in Run 1 of the invention provided greatly improved physical properties in the composite samples, especially in the transverse direction compared to Run 3 made with PPS alone and subjected to a similar heating and slow cooling thermal history. Second, the annealing of slow cooled samples made with the PEEK additive (Run 2) had little or no effect on transverse direction physical properties shown for Run 1. Thus, use of PEEK additive with PPS and subsequent proper heating and cooling steps according to this invention provides compositions with outstanding physical properties in the absence of a more complex quenching then annealing process.

Two attempts were made to prepare composite samples as described above from a prepreg tape made using a mixture of poly(phenylene sulfide) and a poly(phenylene sulfide-ketone) in the aqueous slurry for coating the carbon fibers. However, for reasons currently unknown, the composite samples when removed from the picture frame mold showed cracks along the fiber direction and thus were not suited for further determination of the physical properties.

EXAMPLE VI

FIG. 1 is a photomicrograph of a thin section of a PPS composite material containing carbon fiber but no additive according to this invention. This comparative photomicrograph (FIG. 1) was obtained from the composite of Run 1 in Example III prepared as follows. A 2×2 mm sample was cut from the film-fiber composite in a region which was poor in fiber content so that resin morphology would be more readily observed. The sample was placed on a 25×75 mm glass slide and covered with a 22×22 mm cover glass. A thermocouple lead was taped directly to the cover glass over the sample to observe the temperature and the sample heated to 350°±5° C. on a laboratory hot plate. When the temperature reached about 300° C. a weight of 1 kg was applied to the sample. The sample was cooled under pressure of the weight to ambient temperature at a rate of about 10° C. per minute. The sample was then photographed through a polarizing microscope at 200X magnification. The carbon fiber shown in the photomicrograph is about 7 μm in diameter. FIG. 1 shows the large well defined PPS spherulites of about 30–100 μm and larger diameter. A nucleation of the PPS at the surface of the carbon fiber is also seen in FIG. 1.

FIG. 2 is a photomicrograph of a thin section of a PPS composite material containing carbon fiber and 1% by weight PEEK based on the combined weight of PEEK and PPS. This photomicrograph was obtained from the composite of Run 3 in Example III prepared in the same manner as described above for FIG. 1. FIG. 2 shows the small ill-defined spherulites of about 5–15 μm diameter which is indicative of the nucleating effect of PEEK to produce the fine-grained PPS crystalline morphology. FIG. 2 also does not show an observable nucleation of the PPS at the surface of the carbon fiber in contrast to FIG. 1.

That which is claimed is:

1. A method comprising the steps of:
   (a) blending a first poly(arylene sulfide)-containing composition together with an additive which is effective to achieve a crystalline morphology modification of said poly(arylene sulfide), said first poly(arylene sulfide)-containing composition and said additive forming a mixture;
   (b) heating said mixture to melt the poly(arylene sulfide) present in the poly(arylene sulfide)-containing composition;
   (c) further heating said mixture to at least 15° C. above the temperature employed in step (b); and
   (d) cooling said mixture at a rate of less than about 50° C. per minute thus forming a second poly(arylene sulfide)-containing composition.

2. A method according to claim 1 wherein said additive comprises a polymer additive selected from the group consisting of polyaryl ketone and a poly(arylene sulfide-ketone) and said polymer additive is brought together with said poly(arylene sulfide)-containing composition in an amount sufficient to result in about 0.01 to about 30 weight percent of said polymer additive in said mixture, based on the combined weights of polymer additive and poly(arylene sulfide) in the mixture, and wherein said further heating in step (c) is carried out to a temperature of from about 25° to about 75° C. above the temperature employed in step (b) and said cooling in step (d) is at a rate of from about 0.1° to about 50° C. per minute, wherein the mixture further comprises a fiber reinforcing material.

3. A method according to claim 1 wherein said further heating in step (c) is carried out to a temperature which at least partially melts said additive.

4. A method according to claim 1 wherein said cooling in step (d) is at a rate of about 0.1° to about 10° C. per minute.

5. A method according to claim 2 wherein said further heating is carried out to a temperature which at least partially melts said polymer additive and wherein said cooling is at a rate of about 0.1° to about 15° C. per minute and wherein said polyaryl ketone comprises a polyether ether ketone which is brought together with said poly(arylene sulfide)-containing composition in an amount sufficient to result in about 0.25 to about 2.5 weight percent of said polyether ether ketone in said mixture, based on the combined weights of polyether ether ketone and poly(arylene sulfide) in the mixture.

6. A method comprising the steps of:
   (a) blending a first poly(arylene sulfide)-containing composition together with a polymer-containing additive which is effective to achieve a crystalline morphology modification of said poly(arylene sulfide) to form a mixture having 0.01 to 5 weight percent polymer additive based on the combined weights of polymer in said polymer-containing additive and poly(arylene sulfide);
   (b) heating said mixture to melt said poly(arylene sulfide);
   (c) further heating said mixture to at least 15° C. above the temperature employed in step (b) and
   (d) cooling said mixture at a rate of less than about 50° C. per minute thus forming a second poly(arylene sulfide)-containing composition.

7. A method according to claim 6 wherein said polymer-containing additive comprises a polyaryl ketone having repeat units of the formula

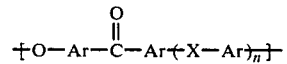

wherein Ar is a divalent aromatic radical independently selected from the group consisting of phenylene, biphenylene, and naphthylene, X is independently selected from the group consisting of O, $$\overset{O}{\underset{\|}{C}},$$

and a direct bond and n is an integer of from 0 to 3.

8. A method according to claim 7 wherein said polyaryl ketone comprises a polyether ether ketone.

9. A method according to claim 8 wherein said polyether ether ketone comprises poly-1,4-oxyphenyloxy-p,p'-benzophenone.

10. A method according to claim 6 wherein said poly(arylene sulfide) of both first and second poly(arylene sulfide)-containing compositions has repeat units of the formula

wherein Ar is a divalent aromatic radical independently selected from the group consisting of phenylene, biphenylene and naphthylene.

11. A method according to claim 10 wherein said poly(arylene sulfide)-containing compositions comprises a poly(phenylene sulfide).

12. A method according to claim 11 wherein the poly(phenylene sulfide) of the poly(arylene sulfide)-containing compositions comprises a poly(phenylene sulfide) in which at least about 90 percent by weight of repeat units have the formula

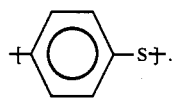

13. A method according to claim 12 wherein said poly(phenylene sulfide) is poly(p-phenylene sulfide).

14. A method according to claim 6 wherein the poly(arylene sulfide) of both said poly(arylene sulfide)-containing compositions has repeat units of the formula

and wherein said polymer-containing additive comprises a polyaryl ketone having repeat units of the formula

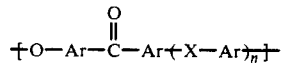

wherein Ar is a divalent aromatic radical independently selected from the group consisting of phenylene, biphenylene and naphthylene, X is independently selected from the group consisting of O

and a direct bond and n is an integer of from 0 to 3.

15. A method according to claim 14 wherein the poly(arylene sulfide) of both said poly(arylene sulfide)-containing compositions comprises a poly(phenylene sulfide) and wherein said polyaryl ketone comprises a polyether ether ketone.

16. A method according to claim 15 wherein said poly(phenylene sulfide) has at least about 90 percent by weight of repeat units with the formula

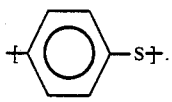

17. A method according to claim 16 wherein said poly(phenylene sulfide) comprises poly(p-phenylene sulfide) and said polyether ether ketone comprises poly-1,4-oxyphenyloxy-p,p'-benzophenone.

18. A method according to claim 16 wherein said poly(phenylene sulfide) is a meltable poly(phenylene sulfide) having a melt flow of from 0 to about 500 g/10 minutes as determined by ASTM method D1238-79, procedure B, modified to use a 5 kg weight, 316° C. temperature, and 0.17 nm orifice.

19. A method according to claim 18 wherein said polyether ether ketone has a reduced viscosity of from about 0.6 to about 3.0 as measured in concentrated sulfuric acid at 25° C.

20. A method according to claim 19 wherein said polyether ether ketone comprises poly-1,4-oxyphenyloxy-p,p'-benzophenone which is blended together with said poly(phenylene sulfide)-containing composition in an amount sufficient to result in about 0.25 to about 2.5 weight percent of said poly-1,4-oxyphenyloxy-p,p'-benzophenone in said mixture, based on the combined weights of poly-1,4-oxyphenyloxy-p,p'-benzophenone and poly(phenylene sulfide) in the mixture.

21. A method according to claim 20 wherein said poly(phenylene sulfide) is substantially free of branching and oxidative crosslinks and has a melt flow of from about 20 to about 100 g/10 minutes.

22. A method for altering the crystalline morphology of a composition comprising a meltable poly(arylene sulfide) and fibrous material, said method comprising bringing together with said composition an additive effective for altering said crystalline morphology to form a mixture of said composition and said additive; heating said mixture above the melting point of said poly(arylene sulfide) and at least 15° C. further; and cooling said mixture at a rate of less than about 50° C. per minute to form a solid composition having an altered crystalline morphology.

23. A method according to claim 22 wherein said additive comprises a polymeric additive selected from the group consisting of a polyaryl ketone and a poly(arylene sulfide-ketone), and said polymeric additive is brought together with said poly(arylene sulfide) and fibrous material in an amount sufficient to result in about 0.01 to about 30 weight percent of said polymeric additive in said composition, based on the combined weights of polymeric additive and poly(arylene sulfide) in the composition is present.

24. A method according to claim 22 wherein said heating is carried out to a temperature of about 25° C. to about 75° C. above the melting point of said poly(arylene sulfide) and said cooling is at a rate of about 0.1° to about 50° C. per minute.

25. A method according to claim 23 wherein said polymeric additive is brought together with said poly(arylene sulfide) and fibrous material in an amount sufficient to result in about 0.01 to about 5 weight percent of said polymeric additive in said composition, based on the combined weights of polymeric additive and poly(arylene sulfide) in the composition and said heating is carried out to a temperature of from about 25° to about 75° C. above the melting point of said poly(arylene sulfide) and said cooling is at a rate of about 0.1° to about 50° C. per minute.

26. A method according to claim 25 wherein said fibrous material is selected from the group consisting of carbon fiber, glass fiber, aramid fiber and boron fiber.

27. A method according to claim 26 wherein said polymeric additive is a polyaryl ketone having repeat units of the formula

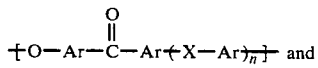

wherein said poly(arylene sulfide) has a melting point of from about 275° to about 290° C. and has repeat units of

wherein Ar is a divalent aromatic radical independently selected from the group consisting of phenylene, biphenylene and naphthylene, X is independently selected from the group consisting of O,

and a direct bond and n is an integer of from 0 to 3.

28. A method according to claim 27 wherein said fibrous material comprises carbon fiber present in an amount of from about 30 to about 80 percent by weight based on the combined weight of carbon fiber, polyaryl ketone and poly(arylene sulfide).

29. A method according to claim 28 wherein said polyaryl ketone comprises a polyether ether ketone and said poly(arylene sulfide) comprises a poly(phenylene sulfide) which has at least about 90 percent by weight of repeat units with the formula

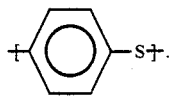

30. A method according to claim 29 wherein said polyether ether ketone has a reduced viscosity of from about 0.6 to about 3.0 as measured in concentrated sulfuric acid at 25° C. and wherein said poly(phenylene sulfide) is meltable and has a melt flow of from 0 to about 500 g/10 minutes as determined by ASTM method D1238-79, procedure B, modified to use a 5 kg weight, 316° C. temperature and 0.17 mm orifice.

31. A method according to claim 30 wherein said polyether ether ketone comprises poly-1,4-oxyphenyloxy-p,p'-benzophenone and said poly(phenylene sulfide) comprises poly(p-phenylene sulfide) having a melt flow of from about 20 to about 100 g/10 minutes.

32. A method of preparing a carbon fiber reinforced thermoplastic resin matrix, said matrix being comprised of poly(arylene sulfide) and a polyaryl ketone, said method comprising forming a mixture of said poly(arylene sulfide), polyaryl ketone and carbon fiber wherein said polyaryl ketone is present in an amount of from 0.01 to about 30 weight percent based on said poly(arylene sulfide); heating said mixture from about 25° C. to about 75° C. above the melting point of the poly(arylene sulfide) and then cooling said mixture at a rate of about 0.1° C. to about 50° C. per minute.

33. A method according to claim 32 wherein said poly(arylene sulfide) comprises poly(phenylene sulfide) which has at least about 90 percent by weight of repeat units with the formula

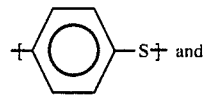

wherein said polyaryl ketone comprises a polyether ether ketone which is present in an amount of from 0.1 to about 5 weight percent based on the poly(phenylene sulfide).

34. A method according to claim 33 wherein said carbon fiber is present in an amount of from about 40 to about 75 weight percent based on the total weight of the carbon fiber, poly(phenylene sulfide) and polyether ether ketone and wherein said polyether ether ketone is present in an amount of from 0.25 to about 2.5 weight percent based on the poly(phenylene sulfide).

35. A method according to claim 34 wherein said poly(phenylene sulfide) is meltable and has a melt flow of from 0 to about 500 g/10 minutes as determined by ASTM method D1238-79, procedure B, modified to use a 5 kg weight, 316° C. temperature and 0.17 mm orifice, and wherein said polyether ether ketone has a reduced viscosity of from about 0.6 to about 3.0 as measured in concentrated sulfuric acid at 25° C.

36. A method according to claim 35 wherein said poly(phenylene sulfide) comprises poly(p-phenylene sulfide) substantially free of branching, oxidative crosslinks and disulfide linkages and which has a melt flow of from about 20 to about 100 g/10 minutes.

37. A method according to claim 36 wherein said polyether ether ketone comprises poly-1,4-oxyphenyloxy-p,p'-benzophenone.

38. A multilayer composite material wherein each layer comprises a carbon fiber reinforced thermoplastic resin matrix made according to the method of claim 32.

39. A multilayer composite article wherein each layer comprises a carbon fiber reinforced thermoplastic resin matrix made according to the method of claim 37.

40. A polymer composition made according to the method of claim 1 comprising a poly(arylene sulfide) and a poly(arylene sulfide-ketone) wherein said poly(arylene sulfide-ketone) is in a form which is insoluble in 1-chloronaphthalene at 230° C.

41. A polymer composition according to claim 40 wherein said poly(arylene sulfide-ketone) is present in an amount of from 0.01 to 10 percent by weight based on the combined weight of poly(arylene sulfide) and poly(arylene sulfide-ketone) and wherein the melting point of said poly(arylene sulfide-ketone) is greater than the melting point of said poly(arylene sulfide).

42. A polymer composition according to claim 41 wherein the melting point of said poly(arylene sulfide-ketone) is at least 20° C. greater than the melting point of said poly(arylene sulfide).

43. A polymer composition made according to the method of claim 1 comprising a poly(arylene sulfide) having a melt crystallization temperature of from 170° to 205° C. and a polyaryl ketone, wherein the weight ratio of poly(arylene sulfide) to polyaryl ketone is from 400:1 to 40:1, wherein the melt crystallization temperature of the composition is greater than 210° C. and wherein said composition further comprises a fiber reinforcing agent.

* * * * *